United States Patent
Doering et al.

(10) Patent No.: US 6,321,837 B1
(45) Date of Patent: Nov. 27, 2001

(54) METHOD AND DEVICE FOR THE IN-SITU ELIMINATION OF HAZARDOUS SUBSTANCES FROM THE GROUNDWATER AND PERCHED WATER

(76) Inventors: Falk Doering; Niels Doering, both of Burghaldenway 51, Stuttgart (DE), D-70649

( * ) Notice: Subject to any disclaimer, the term of this patent is extended or adjusted under 35 U.S.C. 154(b) by 0 days.

(21) Appl. No.: 09/575,376

(22) Filed: May 22, 2000

(51) Int. Cl.$^7$ .................................................. E21B 43/12
(52) U.S. Cl. ........................... 166/248; 166/279; 210/748
(58) Field of Search ...................... 166/279, 372, 166/248, 65.1, 305.1, 310; 405/128; 210/748, 759

(56) References Cited

U.S. PATENT DOCUMENTS

| | | |
|---|---|---|
| 3,752,747 | 8/1973 | Treharne et al. . |
| 4,383,901 | 5/1983 | Smith et al. . |
| 4,479,857 | 10/1984 | Barton, Jr. . |
| 4,497,370 | 2/1985 | Breslin . |
| 4,758,318 | 7/1988 | Yoshida . |
| 4,983,267 | 1/1991 | Moeglich et al. . |
| 4,988,427 | 1/1991 | Wright . |
| 5,074,986 | 12/1991 | Probstein et al. . |
| 5,106,232 * | 4/1992 | Metzer et al. ........................ 405/128 |
| 5,137,608 | 8/1992 | Acar et al. . |
| 5,152,341 * | 10/1992 | Kasevich ............................... 166/248 |
| 5,221,159 * | 6/1993 | Billings et al. ....................... 405/128 |
| 5,279,740 * | 1/1994 | Basile et al. ......................... 210/610 |
| 5,281,312 | 1/1994 | Woodside . |
| 5,458,747 * | 10/1995 | Marks et al. .......................... 204/130 |
| 5,595,644 | 1/1997 | Doring et al. . |
| 5,725,752 * | 3/1998 | Sunderland et al. ................. 205/687 |
| 5,738,778 | 4/1998 | Doring . |

FOREIGN PATENT DOCUMENTS

| | | |
|---|---|---|
| 38 05 200 | 9/1988 | (DE) . |
| 40 06 435 | 9/1991 | (DE) . |
| 40 39 824 | 12/1991 | (DE) . |
| 43 01 270 | 1/1994 | (DE) . |
| 0 312 174 | 4/1989 | (EP) . |
| 0 729 796 | 9/1996 | (EP) . |
| 93/09888 | 5/1993 | (WO) . |

* cited by examiner

*Primary Examiner*—Frank Tsay
(74) *Attorney, Agent, or Firm*—Jacobson Holman, PLLC

(57) ABSTRACT

An in-well method removes hazardous organic substances including oily phases topping the groundwater (LNAPL) and dense liquid non-aqueous phases (DNAPL) occurring on top of the aquitard, irrespective of the viscosity of the pollutants, from groundwater and/or the perched water. In one embodiment, volatile organic pollutants are stripped from the contaminated water by an injected gas stream inside the well. In a second embodiment, the well acts as an electrode. By imparting an electrolytic current between the electrode well and a counter electrode, the organic pollutants are electrochemically degraded while at the same time within the well the degraded pollutants are stripped from the water. By the same arrangement metal ions and colloids can be caused to precipitate onto the well casing. Apparatus for carrying out these methods is also disclosed. In distinction from hitherto known solutions, the method and apparatus are applicable to low performing wells having a low natural throughput, shallow aquifers and in fizzurized rock.

10 Claims, 2 Drawing Sheets

METHOD AND DEVICE FOR THE IN-SITU ELIMINATION OF HAZARDOUS SUBSTANCES FROM THE GROUNDWATER AND PERCHED WATER

FIELD OF THE INVENTION

The present invention relates to a method for in-well cleaning of polluted groundwater and perched water (both hereinafter referred to as "water"), irrespective of the viscosity of the pollutants, oily phases (LNAPLs) topping the water and dense non-aqueous phases (colloid clouds) topping the aquitard, and an apparatus for implementing this method.

BACKGROUND OF THE INVENTION

The state of the art relating to the clean-up of polluted water includes pump & treat (P&T) systems, in which a submerged pump or a pump installed on the site, feeds polluted water from a well to a water treatment plant installed on-site where the water is depolluted below clean-up levels. One result of the pumping is the creation of a cone of depression of the water level towards which the polluted water flows together into the well by gravity. The cleaned water is then reinjected into the aquifer by another well. This method, however, becomes a hazard to nearby buildings because the cone of depression of the groundwater level causes unequal rates of compaction of the soil after dewatering of the area above the cone during a long period of P&T application. The remediation activities frequently take years since only that part of the water is cleaned which corresponds to the natural throughput of the well. The on-site treatment of the water in special waste water treatment plants also is expensive. Further, P&T systems are technically not feasible in wells having only a small throughput, in shallow aquifers and in fizzurized rock.

U.S. Pat. No. 4,497,370 discloses an in-situ method for the recovery of liquid hydrocarbons by flotation in specially designed in-well recovery units (chambers) which are designed to separate the liquid hydrocarbons from the groundwater by a semi-permeable membrane which is pervious to the liquid hydrocarbons. This method, however, is limited to such damage where an oily fluid tops the groundwater. The method cannot treat dissolved, dispersed or colloid pollutants.

A variety of patents relate to so-called circulation wells, such as DE 38 05 200 C1, DE 40 012 012C1 and DE 40 39 824C1, as well as commercial processes, such as the Hydroairlift process (Zueblin Inc., Stuttgart). According to this technology, a small (partial) vacuum ($\Delta p \leq 50$ mbar) is applied onto the well head causing a vertical circulation of the polluted water in the aquifer with the treatment equipment in the center. When impressing the pressure drop, the water level will rise in the well approximately 1 cm per 1 mbar pressure drop. In general, in circulation wells the water is lifted by 22 to 50 cm above the normal water level. Once having been lifted in the well, the lifted water glides on the top of the water level and flows off the well. This water then will sink down at a certain distance from the well and is finally sucked in by the well at its lower end. The circulation is now complete. A prerequisite for the circulation, however, is a packer within the circulation well to separate the effluent from the take in. A packer (sealing) is also required for the annulus. The second prerequisite for a circulation well is a velocity of the groundwater of less than one foot/d; otherwise, the circulation will break down at least partially, discharging uncontrolled and only partially cleaned water into the aquifer. The pollutants are extracted by ambient air. The separation of the air and the pollutants is effected by a submerged stripping reactor. Official research of German regulating agencies could not find, however, clear evidence that this type of well works at all and that the claimed results can be achieved in real circumstances. See, for example, University of Karlsruhe on instruction of the Baden-Wuerttemberg State EPA: Documentation and Assessment of Selected Case Histories as to Halogenated VOCs (CVOCs) in Groundwater and the Remediation Thereof by Means of the UVB-Method; Karlsruhe 1990.

DE 40 06 435C2 discloses a method for an in-well stripping of dissolved volatile organic pollutants (VOCs) and to the flotation of liquid pollutants by gases other than ambient air, such as carbon dioxide and nitrogen. The gases act as an extraction agent to carry (strip) the pollutants out of the water as the gases move up and out of the well.

For electrochemical water treatment plants, the state of the art contemplates that organic substances can be decomposed at electrodes by means of anodic oxidation and cathodic reduction, such as disclosed in patents U.S. Pat. No. 4,988,427, U.S. Pat. No. 4,983,267, U.S. Pat. No. 4,383,901, AU-E21339B, DE 40 07 805 A1.

The underlying problem addressed by the present invention is to devise a low cost method and apparatus related to the in-well extraction or the in-well destruction of organic constituents in the water-bearing layers of the soil, irrespective of the viscosity of the pollutants and/or the precipitation of inorganic substances onto the well casing. It is a further object of the invention to provide a method and apparatus which will work effectively in aquifers having a low permeability (i.e. $k_f \geq 10-5$ m/s), and wells having a small output or situated in fizzurized rock where a circulation cannot be established. Another purpose of the present invention is that it does not change the water level in the ground.

According to the type of pollutant, the solution offered by the present invention is subdivided into the basic system dealing exclusively with volatile hydrocarbons (a CVS-type I well), and into an extended version. In the extended version, the CVS-type I well is upgraded so as to perform as an electrode. Then, by providing another electrode to serve as a counter electrode, appropriate reactions of anodic oxidation or cathodic reduction can be carried out within the well for the destruction of colloids and semi- and non-volatile pollutants, such as pesticides, PAH, TPH, MTBE, etc. and/or for the precipitation of inorganic substances (a CVS-type II).

SUMMARY OF THE INVENTION

An important aspect of the present invention consists of the fact that all water bearing layers in soils and rock, as well as all organic pollutants irrespective of their viscosity and/or colloidal or ionic metals, are sucked into the well by a partial vacuum even in those cases where pumps would fail because of a lack of water. In the well design, a most important feature of the present invention is that the packers are omitted. The screen tour covers an area from 2 inches to 5 inches below the water level to the aquitard without any interruption by sealed sections. A second distinctive feature of the present invention in comparison to other systems is that the water level in the soil remains unchanged. To this end, the bottom of the head pipe is positioned about 2 inches to 5 inches below the water level. An auxiliary mobile pipe inside the well may adjust the depth of the head pipe to the desired water level in the event that serious changes in the water level occur. The adjustment of this auxiliary pipe preferably is controlled automatically by level switches controlling a lifting device such as a toothed shaft and a step-by-step motor. A third distinction of the present invention over hitherto known systems is that the partial vacuum is increased substantially to $\Delta p \geq 200$ mbar, and the vacuum is limited to the head space above the water, and the extent of cavitation if any, within the head pipe of the well. As a result of these measures, the output of the well will increase by a factor 8 to 10 against the original output, which substantially reduces the duration of the remedial activities.

The head space of the head pipe serves as a whirl chamber, contributing substantially to the degassing of VOCs. A completely new hydraulic regime is thus established. In particular, the increase of the throughput of the well substantially increases the average velocity of the water which again supports the clean-up activities by a mechanical purge of the aquifer which in turn reduces the risk of the rebound, i.e. the saw tooth development of the pollution concentration. Since the horizontal vector of the natural flow of the water adds to the vertical vector of the water in the well, the water taken into the well flows off the well in an angle between 320 and 650 dependent on the dimensions of the partial vacuum. The well is no longer a circulation well; rather, the well has become now an evacuation well. The driving force of the evacuation well is the strong partial vacuum which lifts the water into the head pipe. In accordance with the present invention, the partial vacuum is dimensioned such that a controlled cavitation is generated. By so doing, the head pipe is converted into a whirl chamber. Cavitation must be controlled so that the vacuum pumps are not affected by oscillating pressures. The turbulences in the whirl chamber provide for the flow off of the water sucked in the head pipe. The flow off is also supported by the Venturi effect related to the stream delta generated by the flow of the water off the head pipe and the flow off of the water in the aquifer.

The performance of the extraction agent must necessarily correspond to the high water throughput in order to avoid a flow off of only partially cleaned water. In pretests at a water remediation project, the extraction agent must be determined for optimum performance in light of the pollutant or pollutants in the water. Ambient air in general is to be excluded due to the low performance of extraction if air is present. The extraction agent can be formed of a single or preferably a mixture of acceptable gases, such as oxygen, hydrogen, nitrogen, ammonia, carbon dioxide, and carbon monoxide, which are on-site mixed prior to injection. The extraction agent is injected into the water near the bottom of the well by a special ejector which provides for optimum dispersion of the extracting agent in the water. Determining factors for the extraction agent are the physical and chemical properties of the water, such as pH, hardness, temperature, etc., and the type of pollutants. In this type of well, VOCs including halogenated VOCs (CVOCs) can be extracted from the water. The pollutants are simply carried out of the well by the extracting agent, serving now as carrier gas. The waste gases are recovered by specialized installations in compliance with the known state of the art, such as by adsorption at molecular sieves, by condensation in cryo-traps, by catalytic oxidation, or by biodegradation in biofilters, only to mention the most important methods. This plant is preferably installed on-site.

As to pollutants having a low viscosity, the present invention combines the elements of the previously described well (CVS-type I), with an in-well electrochemical degradation of organic constituents (CVS-type II). In this case, the well is converted into an electrode well and is complemented by a counter electrode which also can be a well. Connecting the electrode well with the positively charged receptacle of the d.c.-source, reactions of anodic oxidation are caused in the well, oxidizing even LNAPLs as thick as 10 feet and more and substances such as plasticizers, TPH, lubricating oils, PAHs, or MTBE. On the other hand, when connecting the electrode well with the negatively charged receptacle of the d.c.-source, then in-well reactions of cathodic reduction are effected which in particular decompose halogenated compounds, such as HCH, DDT, and other chlorinated pesticides such as Mirex, PCBs, PCP, HCB, and chlorinated substances originating from the production of PVC, such as hexachloro-butandiene. Ions or colloids of heavy metals can be precipitated onto the well casing. In the event that both types of electrochemical reactions are required, then two electrode wells can be installed, one working as an anode and the other as a cathode.

The foregoing principles of the present invention, which will become subsequently more apparent, reside in the details of construction and operation as more fully hereinafter described and claimed, reference being had to the accompanying drawings forming a part hereof, wherein numerals refer to like parts throughout.

DETAILED DESCRIPTION OF THE PREFERRED EMBODIMENTS

Figure 1:
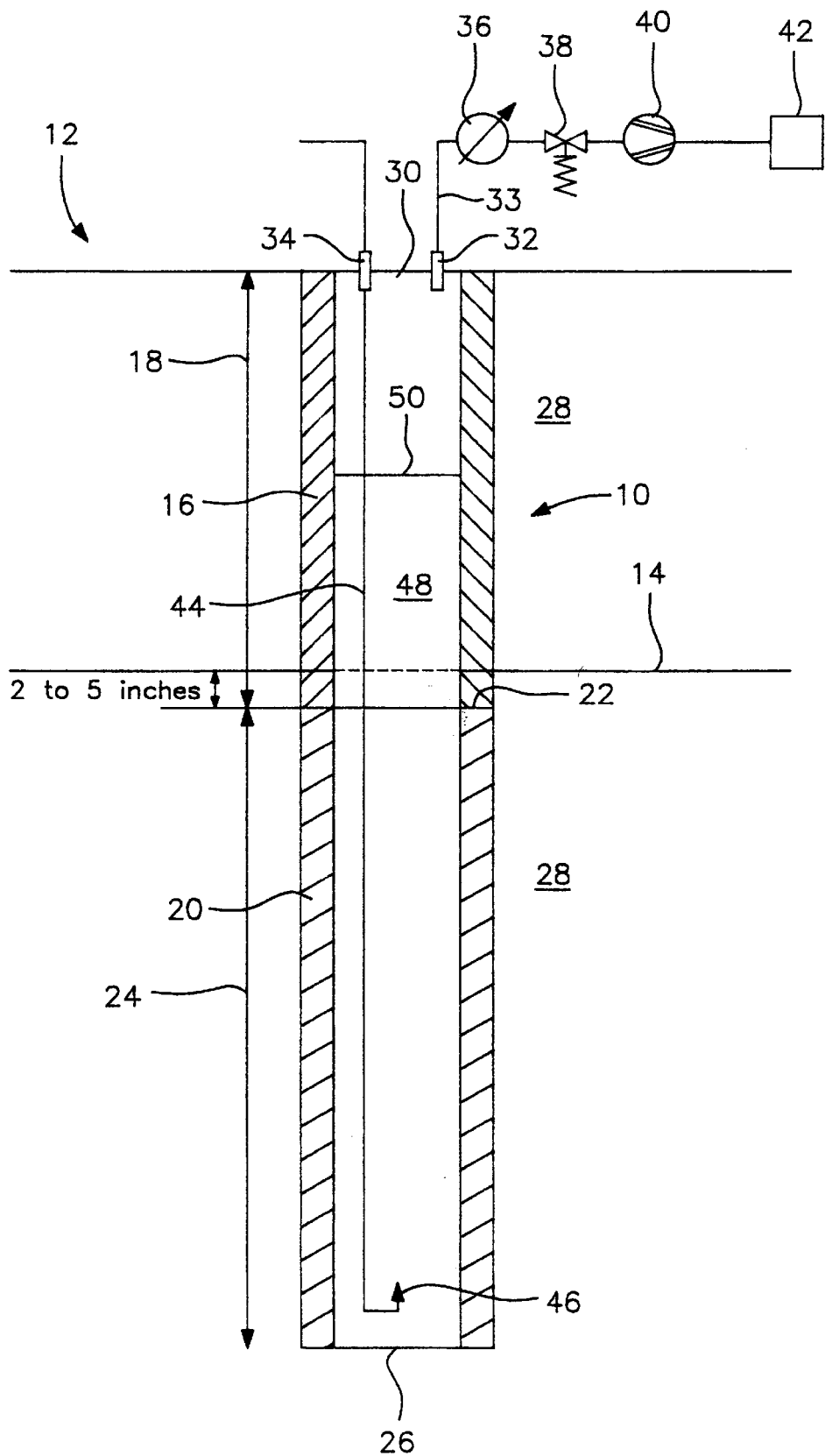
FIG. 1 is a vertical sectional view of a well in accordance with the present invention (CVS-type I) in which an extraction agent strips CVOCs from the polluted water.

Although only two preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing this invention, specific terminology will be resorted to for the sake of clarity. It is to be understood that each specific term includes all technical equivalents which operate in a similar manner to accomplish a similar purpose.

Referring now to FIG. 1, there is illustrated a well in accordance with the present invention generally designated by the reference numeral 10 in the soil region generally designated by the reference numeral 12. In its lower reaches, the soil region 12 has an aquifer or a layer of perched water with an upper water level 14. In general, the working depth of the well 10 is limited only by the technical capacity of the drilling rig.

As illustrated, the well 10 is a standard CVS well comprising a full mantle head pipe 16 extending the length of the well designated by the line 18, a screen tour 20 whose top 22 is spaced from 2 to 5 inches below the water level 14 extending the length of line 24, and a bottom cap 26. The head pipe 16 and the screen tour 20 are preferably made of suitable plastic materials, but also can be made of steel or stainless steel. The nominal diameter of the pipe forming the well should be greater than 2 inches, preferably on the order of 5–6 inches. The annulus 28 surrounding the well 10 is sealed in the range of the head pipe 16 by clay, clay pellets or a mixture of clay and bentonite and filled underneath this sealing in the range of the screen tour 20 by filter gravel. The well head 30 includes or has the shape of a cap which seals the top of the well 10 gas tight. In the well head 30 are incorporated two transducers 32 and 34. The first transducer 32 is connected by a vacuum hose or pipe 33 with a pressure gauge 36, a pressure relief valve 38 and vacuum pump 40 leading to the waste gas treatment plant 42. In line sampling devices may also be included.

The second transducer 34 serves to supply the extraction gas via a pipe or a plastic hose 44 to the ejector 46. The ejector is installed in the well as deep as possible, and is designed to provide to the water the maximum quantity of gas bubbles possible. The quantity of extraction gas ejected depends on the type of gases ejected, the physical properties of the water, and the type of pollutants to be carried out. When applying a partial vacuum onto the well head through transducer 32, the water level in the well 10 will rise up into the chamber 48 and reach a level 50, dependent on the duration of the maintenance of the $\Delta p$. The chamber 48 acts as a whirl chamber in which the ejected gas(es) separate from the water and carry the pollutants out of the well.

Figure 2:
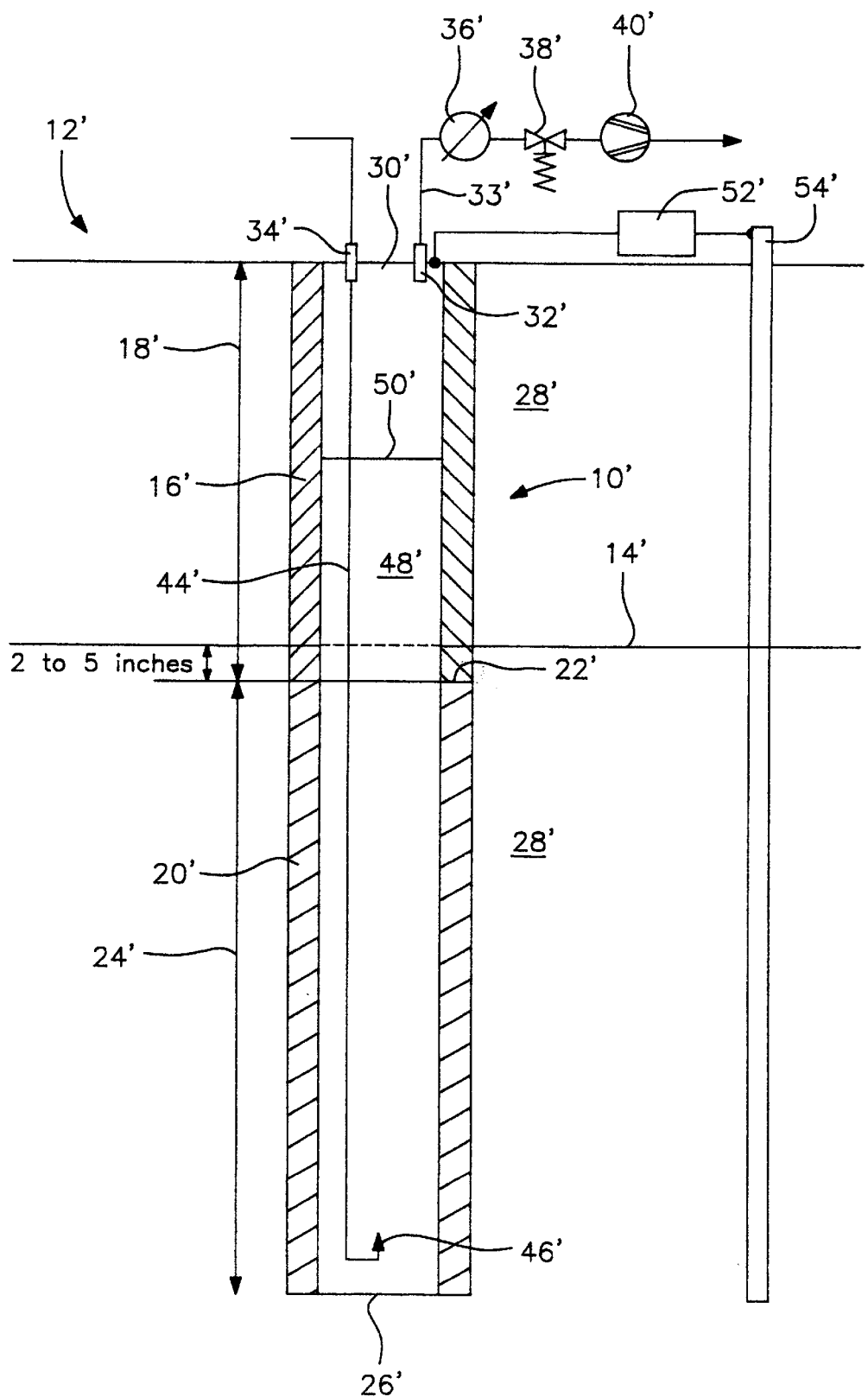
FIG. 2 is a vertical sectional view illustrating another well in accordance with the present invention (CVS-type II) in which the well of FIG. 1 is modified to include an electrode operating in conjunction with a spaced counter electrode to electrochemically degrade organic pollutants while at the same time extracting the pollutants with the carrier gas and/or precipitate metal ions or colloids onto the well casing.

Turning now to the embodiment shown in FIG. 2, the well 10' and its components are the same as described in connection with FIG. 1 with the components in FIG. 2 having the same number identification followed by a prime ('). The FIG. 2 embodiment further includes a threephase a.c.rectifier unit 52' which provides a rectified direct current to the well 10'. The material of this well 10' is steel or stainless steel, or under special conditions graphite and/or carbon materials so that the well itself becomes an electrode. Connected to the other side of the rectifier unit 52' is a counter electrode 54' which extends into the soil region 12' a depth approximately equal to the depth of the well 10'. When the electrode well 10' is energized with the appropriate charge by the rectifier 52', the desired oxidation or reduction reactions cause an electrochemical degradation of the organic pollutants in the well. The degraded constituents can then be carried up and out of the whirl chamber 48' by the carrier gas ejected into the water at the bottom of the well by ejector 46'.

The method as described in connection with FIG. 1 (CVS-type I) has been tested in Northern Germany on a site of approximately 3 acres. A plume of CVOCs extended from the center of the damage approximately 400 feet downstream. The geology comprised glacial sands from ground surface to a depth of about 60 feet, underlaid by a thick layer of marine clays. The groundwater table occurred at 20 feet to 60 feet below the ground surface. The pollution was trichloroethylene having a maximum concentration of 180.000 $\mu g/l$, cis 1,2-dichloroethylene having a maximum concentration of 10,000 $\mu g/l$ and BTEX at 180 $\mu g/l$. The clean-up level specified no more than 25 $\mu g/l$ total CVOCs and 5 mg/l BTEX (benzene: 0.5 $\mu g/l$). The area was covered by a system of 14 wells, similar to well 10, arranged at about 100 feet distance from each other on five lines in the field, each line having at the distance of about 200 feet from each other. The wells had a depth of 65 feet. The $\Delta p$ totaled 320 mbar, the extracting agent was a mixture of carbon dioxide (85% by volume) and nitrogen (15% by volume) which was fed to the well at a rate of 300 normalized liters per hour at a pressure of 2.5 bar or 29 psi. Within 6 weeks of operation, the specified clean-up levels had been reached. A continuing period of operation served to prevent a rebound.

The method described in connection with FIG. 2 (CVS-type II) has been tested in Berlin on a site of about 1 acre where a diesel fuel station had been operated. About 60,000 liters of diesel fuel were said to have spilled over the storage tanks polluting the sand from ground surface to a depth of about 20 feet where the clay occurred. The groundwater level was at four feet, two inches below grade. The diesel fuel was forming a LNAPL of about 10 feet (thickness of product/LNAPL). The area was covered by four electrode wells similar to electrode well 10' and operated as anodes. The counter electrode 54' was installed as a steel tube for each electrode well 10', spaced apart from its respective electrode well a distance of about 25 feet. The electrode wells 10' and counter electrodes 54' had a depth of about 20 feet. After 75 days of operation, the LNAPL had been eliminated; the residual pollutants were subjected to natural attenuation.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What we claim as new is as follows:

1. An in-situ method of eliminating harmful substances from polluted groundwater and/or perched water contained in soils, which comprises:
   A. establishing at least one well in said polluted water, said well having a head pipe, a well head and a screen tour, said head pipe extending at least 2 inches below the water table defining a natural water level;
   B. applying a partial vacuum to said well head to create a pressure drop of at least 200 mbar to form a whirl chamber in said head pipe extending from said natural water level in said soil to an elevated water level inside the head pipe; and
   C. injecting an extracting agent into said polluted water in said screen tour to lift volatile harmful substances out of said well, while excluding ambient air from said well.

2. An in-situ method according to claim 1, wherein said well serves as an electrode in an electrolytic circuit with a counter electrode positioned in said soil to decompose harmful non-volatile substances by electrochemical reactions in said well.

3. An in-situ method according to claim 2, wherein metal ions and colloids are caused to precipitate onto the well casing.

4. An in-situ method according to claim 2, wherein said electrochemical reactions comprise anodic oxidation or cathodic reduction.

5. An in-situ method according to claim 2, wherein one of said electrode and counter electrode serves as an anode made of steel, stainless steel, graphite or carbon materials.

6. A method according to claim 1, wherein gaseous byproducts, originating from the decomposition of harmful pollutants, are suctioned away at the location(s) of the electrodes.

7. A method according to claim 1, wherein the electrodes comprise a system of a plurality of wells.

8. A method according to claim 1, wherein said extracting agent is selected from carbon dioxide, carbon monoxide, oxygen, hydrogen, nitrogen, ammonia and mixtures thereof.

9. A method according to claim 1, wherein the step of applying a partial vacuum is sufficient to generate a controlled in-well cavitation in said whirl chamber.

10. An in-situ method of eliminating harmful organic substances from polluted groundwater and/or perched water in soil comprising:

applying a partial vacuum to at least one well made of an electrode material positioned in said polluted water, said well having a sealed head pipe and a screen tour for introducing said polluted water to said well, said partial vacuum creating a pressure drop of at least 200 mbar in said head pipe to elevate said water inside the head pipe to a level above a natural water level in said soil, applying a direct current between said well and a counter electrode sufficient to degrade said organic substances by redox reactions in said well, and removing said degraded organic substances from said well out of said head pipe.

\* \* \* \* \*